Patented Apr. 16, 1935

1,998,240

UNITED STATES PATENT OFFICE 1,998,240

PROCESS FOR THE PREPARATION OF DIBENZOTHIAZYLDISULPHIDE FROM 2-MERCAPTOBENZOTHIAZOLE

Gerhard Källner, Ida- und Marienhutte, Germany, assignor to Silesia Verein Chemischer Fabriken, Ida- und Marienhutte, near Saarau, Silesia, Germany No Drawing. Application June 26, 1934, Serial No. 732,466. In Germany July 18, 1933

4 Claims. (Cl. 260—16)

This invention relates to a process for the preparation of dibenzothiazyldisulphide from 2-mercaptobenzothiazole.

According to this invention it has been found that mercaptobenzothiazole may be converted in a simple manner into dibenzothiazyldisulphide by treating the same in the manner hereinafter described at room temperature and without the supply of external heat with aqueous nitric acid.

It is known that mercaptobenzothiazole can be converted into the corresponding disulphides by causing oxygen or oxygen-containing gases to react with an aqueous suspension of the mercapto compound in the presence of nitrogen oxides or nitrous acid which serve as oxygen carriers. It is further known that mercaptothiazoles can be oxidized to disulphides with the aid of dilute nitric acid at boiling temperature. Pure products cannot be obtained by these known processes, so that the products resulting from the oxidation have to be subjected to a further special purifying process. Moreover, during the treatment at boiling temperature, a large quantity of nitric acid is lost unused.

The following examples serve to illustrate how the process of this invention may be carried into effect:

1. 167 kgms. of 2-mercaptobenzothiazole are mixed with a nitric acid, which has been prepared from 200 kgms. of water and 34 kgms. of nitric acid (62% HNO₃). The mixture is periodically kneaded and after about 8 to 10 hours the oxidation is completed. The mixture is stirred with water and filtered and the solid matter washed with water. About 165 kgms. of dibenzothiazyldisulphide of freezing point 172° to 178° are obtained.

2. 167 kgms. of 2-mercaptobenzothiazole are suspended in 400 kgms. of water. 68 kgms. of nitric acid (62% HNO₃) are added to the suspension with stirring. The conversion is completed after about 10 hours and 165 kgms. of dibenzothiazyldisulphide of freezing point 173° to 177° C. are obtained.

The mother liquor is employed for suspending the next batch, fresh nitric acid being added to the suspension to replace the used up acid. The mother liquor may be returned to the process as often as desired. The conversion is with advantage carried out in a closed vessel, in which a slight excess pressure is maintained by suitable closure so that the resulting NO may escape.

3. 167 kgms. of 2-mercaptobenzothiazole are mixed in a closed vessel, if necessary with stirring, with a nitric acid which has been prepared from 400 kgms. of water and 68 kgms. of nitric acid (62% HNO₃). During the conversion an excess pressure of 0.2 to 1.0 atmospheres is maintained in the apparatus. The oxidation is completed after about 5 to 8 hours and the product is worked up as described in Example 2. The mother liquor may be returned to the process as often as desired, exactly as described in Example 2. The yield and purity of the resulting disulphide are the same as those of the products obtained in the preceding examples.

The nitric acid employed for the oxidation must have a minimum concentration of about 7%, if it is desired to carry the oxidation through to completion. Stronger acids may, of course, also be employed, the operation being, for example, carried out with an aqueous nitric acid, containing 7 to 20% of HNO₃. The process in these cases is carried out as described in the foregoing examples and the water and nitric acid are used in such proportions that the resulting nitric acid has the desired concentration. The oxidation may be effected both with the theoretical quantity of nitric acid and also with an excess. Of the nitric acid employed in excess, only a quantity corresponding to the equation $$6RSH + 2HNO_3 = 3R\text{—}S\text{—}S\text{—}R + 4H_2O + 2NO$$

is each time used up. Theoretically this quantity amounts to ⅓ of a mol of nitric acid per one mol of mercaptobenzothiazole.

I claim:

1. A process for the preparation of dibenzothiazyldisulphide from 2-mercaptobenzothiazole, which consists in treating 2-mercaptobenzothiazole at room temperature and without the supply of external heat with aqueous nitric acid having a concentration of at least 7%.

2. A process as claimed in claim 1, wherein the nitric acid employed has a concentration of from 7 to 20%.

3. A process as claimed in claim 1, wherein the operation is carried out in a closed vessel under a slight excess pressure.

4. A process as claimed in claim 1, wherein an excess of nitric acid is employed for the oxidation and the non-used up nitric acid is employed for the oxidation of further quantities of mercaptobenzothiazole.

GERHARD KÄLLNER.